(12) United States Patent
Kang et al.

(10) Patent No.: US 12,741,510 B2
(45) Date of Patent: Sep. 22, 2026

(54) THERMAL MANAGEMENT FLUID MODULE FOR VEHICLE

(71) Applicant: Hanon Systems, Daejeon (KR)

(72) Inventors: In Keun Kang, Daejeon (KR); Young Man Kim, Daejeon (KR); Kyeong Cheol Lee, Daejeon (KR); Jae Min Lee, Daejeon (KR); Chan Jin Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 301 days.

(21) Appl. No.: 18/381,281

(22) Filed: Oct. 18, 2023

(65) Prior Publication Data

US 2024/0131903 A1 Apr. 25, 2024
US 2024/0227509 A9 Jul. 11, 2024

(30) Foreign Application Priority Data

Oct. 25, 2022 (KR) ........................ 10-2022-0138007

(51) Int. Cl.
*B60H 1/32* (2006.01)

(52) U.S. Cl.
CPC ....... *B60H 1/3229* (2013.01); *B60H 1/32281* (2019.05)

(58) Field of Classification Search
CPC ......................... B60Y 2200/91; F24F 2221/36
See application file for complete search history.

(56) References Cited

U.S. PATENT DOCUMENTS

2020/0011547 A1* 1/2020 Hong ........................ F25B 1/04
2021/0016632 A1* 1/2021 Oh ...................... H01M 6/5038
2024/0025226 A1* 1/2024 Jin ......................... F25B 41/20

FOREIGN PATENT DOCUMENTS

CN 109910590 A * 6/2019
DE 102020113711 2/2021
DE 112022001862 1/2024

OTHER PUBLICATIONS

Translated_Wang (Year: 2019).*
Official Action issued Jan. 22, 2025 in related German Patent Application No. 102023129259.5, 13 pgs.

* cited by examiner

*Primary Examiner* — Jerry-Daryl Fletcher
*Assistant Examiner* — Samba Nmn Gaye
(74) *Attorney, Agent, or Firm* — NORTON ROSE FULBRIGHT US LLP

(57) ABSTRACT

A thermal management fluid module for a vehicle is provided using a circulating fluid such as a refrigerant or a coolant, the thermal management fluid module including a manifold plate in which a plurality of fluid flow channels are formed, and a thermal interference avoidance unit which is coupled to the manifold plate and in which fluid flow channels having a relatively high temperature or low temperature are formed to be separated and spaced apart from other fluid flow channels among the fluid flow channels.

3 Claims, 4 Drawing Sheets

THERMAL MANAGEMENT FLUID MODULE FOR VEHICLE

CROSS-REFERENCE TO RELATED APPLICATION

This application claims priority to and the benefit of Korean Patent Application No. 10-2022-0138007, filed on Oct. 25, 2022, the disclosure of which is incorporated herein by reference in its entirety.

BACKGROUND

1. Field of the Invention

The present invention relates to a thermal management fluid module for a vehicle, and more specifically, to a thermal management fluid module for a vehicle in which parts such as a heat exchanger and valves are modularized into one.

2. Discussion of Related Art

Under the trend of the development of environmentally friendly industries and the development of energy sources for replacing fossil raw materials, in fields of the vehicle industry that has recently been receiving the most attention, there are electric vehicles and hybrid vehicles. Batteries are in installed electric vehicles and hybrid vehicles to provide driving power and are used not only for driving but also for cooling or heating.

In vehicles in which batteries are used to provide driving power, the fact that the batteries are used as heat sources during cooling or heating means that a driving range is reduced accordingly. In order to overcome such a problem, a method of applying a thermal management system, which has been conventionally widely used as a home heating and cooling system, to vehicles has been proposed.

For reference, a thermal management system is a system for absorbing low-temperature heat and shifting the absorbed heat to a high temperature. As an example, a thermal management system has a cycle in which a liquid fluid evaporates in an evaporator, takes heat from the surroundings to become a gas, and then liquefies while releasing heat to the surroundings through a condenser. When the thermal management system is applied to electric vehicles or hybrid vehicles, there is an advantage in that a heat source may be secured in addition to a heat source insufficient for conventional air conditioning devices.

Currently, a modular configuration of a thermal management system for an electric vehicle adopts a partial modularization method in which important parts (valves, accumulators, chillers, condensers, internal heat exchangers, sensors, and the like) are connected through pipes. In a process of modularizing the thermal management system for a vehicle, there is a problem that thermal management performance is degraded due to thermal interference between a high-temperature fluid and a low-temperature fluid.

SUMMARY OF THE INVENTION

The present invention is directed to providing a thermal management system for a vehicle having a structure in which, since a low-temperature fluid flowing out of an evaporator flows to an accumulator without passing through a manifold plate, thermal interference with a high-temperature fluid flow channel is avoided, thereby preventing the degradation of thermal management performance.

The present invention is also directed to providing a thermal management system for a vehicle having a structure in which, since a high-temperature fluid flowing out of an external heat exchanger flows to an evaporator without passing through a manifold plate, thermal interference with a relatively low-temperature fluid flow channel is avoided, thereby preventing the degradation of thermal management performance.

The present invention is also directed to providing a manifold fluid module in which a high-temperature area and a low-temperature area of a fluid during an air conditioner mode are separated, thereby minimizing thermal interference between refrigerants and improving thermal management performance.

According to an aspect of the present invention, there is provided a thermal management fluid module for a vehicle using a circulating fluid such as a refrigerant or a coolant, the thermal management fluid module including a manifold plate in which a plurality of fluid flow channels are formed, and a thermal interference avoidance unit which is coupled to the manifold plate and in which fluid flow channels having a relatively high temperature or low temperature are formed to be separated and spaced apart from other fluid flow channels among the fluid flow channels.

The fluid may be a refrigerant that circulates through a compressor, a condenser, an expansion valve, an evaporator, and an accumulator.

The fluid flow channels formed to be separated from the manifold plate may include a fluid flow channel configured to allow a low-temperature fluid flowing out of an evaporator to flow to an accumulator, and a fluid flow channel configured to allow a high-temperature fluid flowing out of an external heat exchanger to flow to the evaporator.

The thermal interference avoidance unit may be a branch pipe which is coupled to one surface of the manifold plate and in which a fluid flow channel is formed.

The branch pipe may include a first pipe configured to allow a low-temperature fluid flowing out of an evaporator to flow to an accumulator, and a second pipe configured to allow a high-temperature fluid flowing out of an external heat exchanger to flow to the evaporator.

A first branch port and a second branch port for connection of the first pipe and the second pipe may be coupled to one surface of the manifold plate.

The second pipe may include a first connection portion configured to connect the external heat exchanger and the second branch port, a second connection portion configured to connect the second branch port and one side of the first pipe, and a third connection portion configured to connect the one side of the first pipe and the evaporator.

A diameter of the first pipe may be relatively greater than a diameter of the second pipe.

The manifold plate may include a bottom plate and a top plate coupled to protrude from one surface of the bottom plate and form the fluid flow channels, and the branch pipe may be connected to the other surface of the bottom plate.

According to another aspect of the present invention, there is provided a thermal management fluid module for a vehicle using a circulating fluid such as a refrigerant or a coolant, the thermal management fluid module including a manifold plate in which a plurality of fluid flow channels are formed, and a branch pipe coupled to the manifold plate and formed to allow the fluid to flow into the fluid flow channel in the manifold plate or to bypass the fluid flow channel without flowing into the fluid flow channel according to a fluid circulation mode.

A heat exchanger and a valve may be coupled to one surface of the manifold plate, and a branch port to which the branch pipe is connected may be provided on the other surface of the manifold plate.

The branch port may include a first inlet through which the fluid flows in, a first outlet connected to the manifold plate, and a second outlet connected to the branch pipe.

According to the fluid circulation mode, the fluid flowing in through the first inlet may flow into the fluid flow channel of the manifold plate through the first outlet and flow to the heat exchanger and the valve.

The fluid circulation mode may include a heating mode and a cooling mode, wherein, in the heating mode, the fluid may flow into the fluid flow channel of the manifold plate, and in the cooling mode, the fluid may flow by bypassing the manifold plate.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
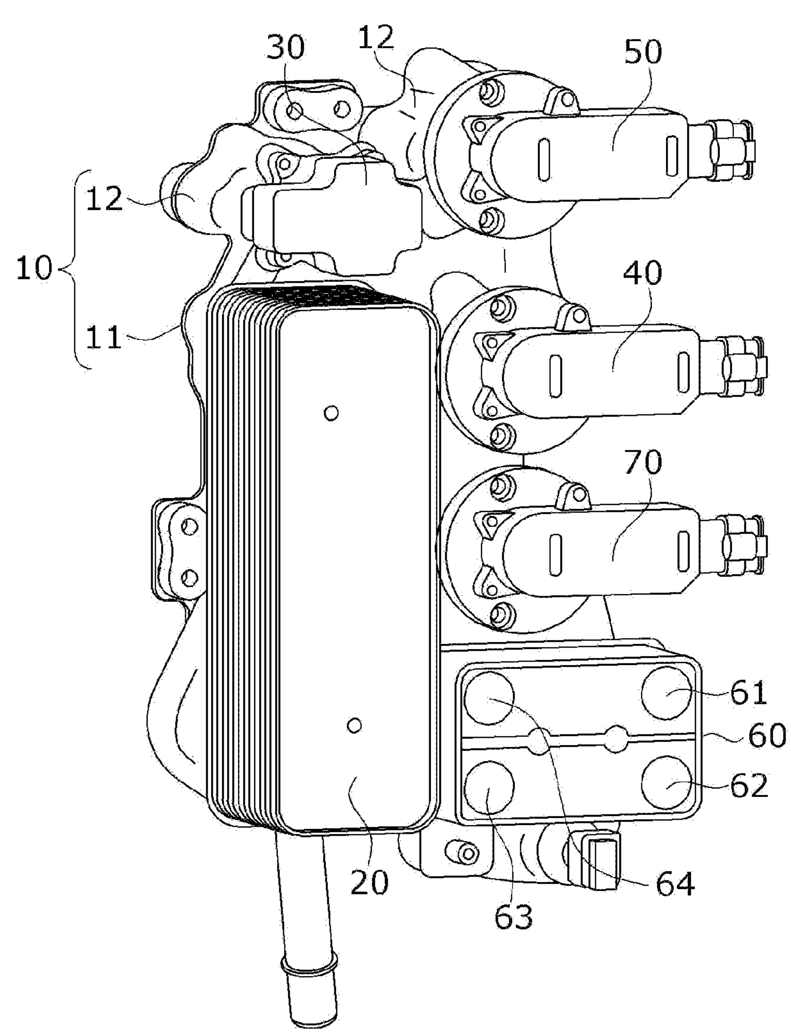
FIG. 1 is a perspective view illustrating a front surface of a thermal management fluid module for a vehicle according to one exemplary embodiment of the present invention.

The present invention may be modified in various ways and implemented according to various exemplary embodiments, and specific exemplary embodiments are illustrated in the drawings and will be described in detail. However, the present invention is not intended to be limited to the specific exemplary embodiments, and it is interpreted that all modifications, equivalents, and substitutions belonging to the concept and technical scope of the present invention are included in the present invention. In describing the present invention, when it is determined that detailed description of known techniques involved in the present invention may obscure the gist of the present invention, the detailed description thereof will be omitted.

While terms such as "first," "second," and the like may be used to describe various components, such components must not be understood as being limited by the above terms. These terms are only used for the purpose of distinguishing one element from another element.

The terminology used in this application is for the purpose of describing particular exemplary embodiments only and is not intended to be limiting of the invention. A singular expression includes a plural expression unless the context clearly indicates otherwise. In this application, it should be understood that terms such as "include" and "have" are intended to indicate that there is a feature, number, step, operation, component, part, or a combination thereof described in the specification, and they do not exclude in advance the possibility of the presence or addition of one or more other features or numbers, steps, operations, components, parts, or combinations thereof.

In addition, in the specification, "connected to" this does not mean only that two or more constituent elements are directly connected to each other, but the two or more constituent elements may be indirectly connected and physically connected through other constituent elements, and they may also be electrically connected or referred to by different names depending on the position or function, which may mean that they are one body.

Hereinafter, exemplary embodiments of a manifold fluid module according to the present invention will be described in detail with reference to the accompanying drawings, and in describing the exemplary embodiments with reference to the accompanying drawings, the same or corresponding components are assigned the same reference numerals, and redundant description thereof will be omitted.

Figure 2:
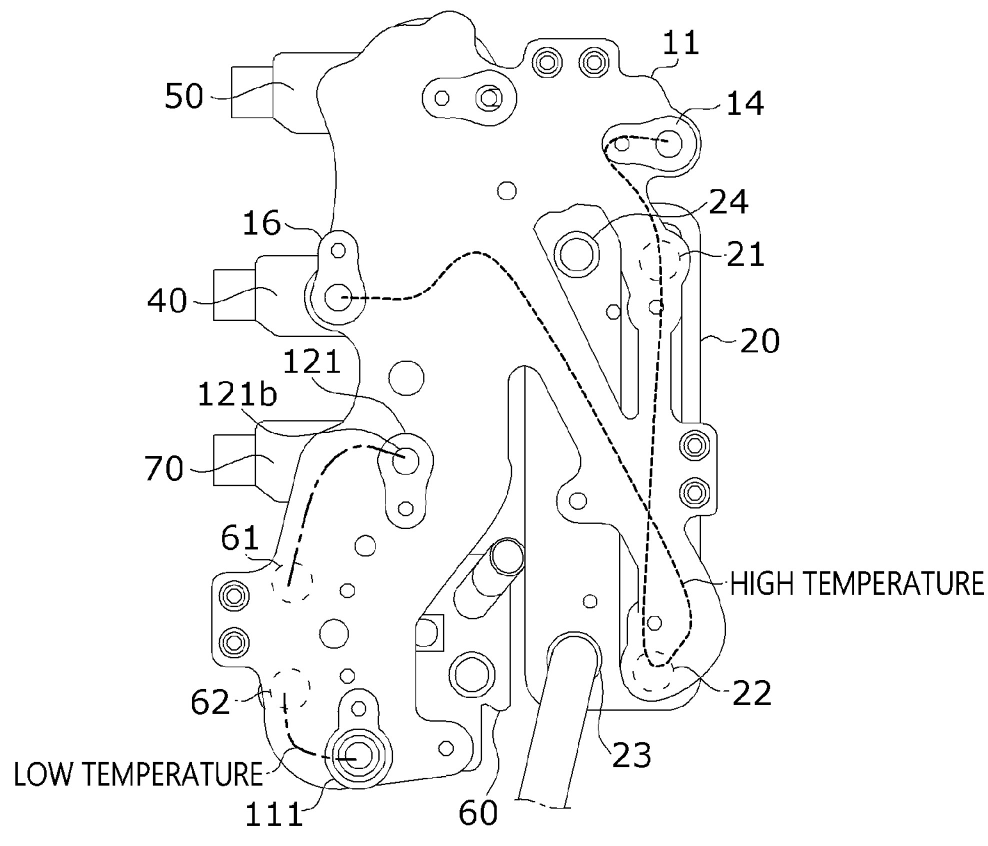
FIG. 2 is a perspective view illustrating a rear surface of the thermal management fluid module for a vehicle according to one exemplary embodiment of the present invention.
Figure 3:
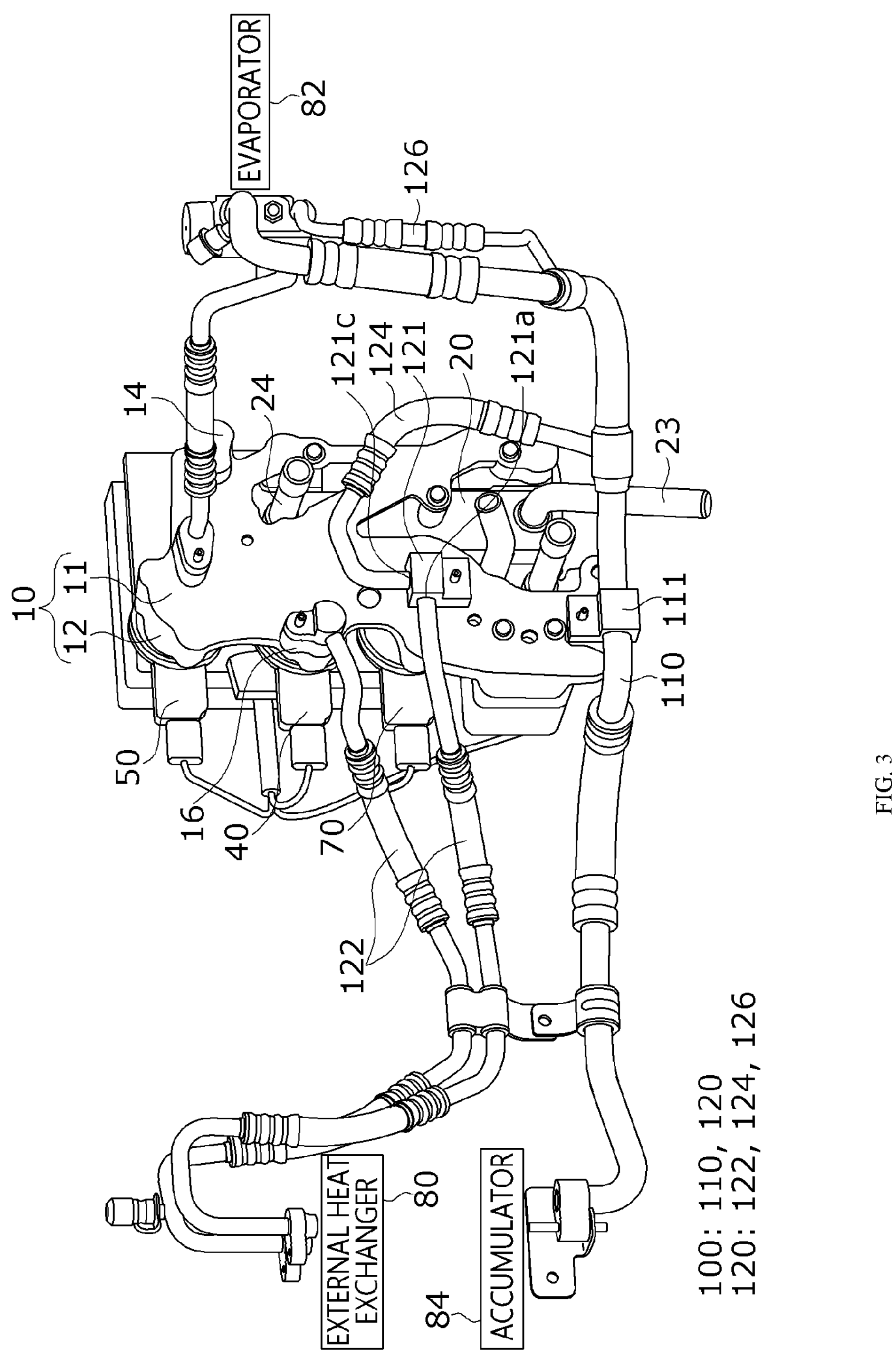
FIG. 3 is a perspective view illustrating the thermal management fluid module for a vehicle according to one exemplary embodiment of the present invention.
Figure 4:
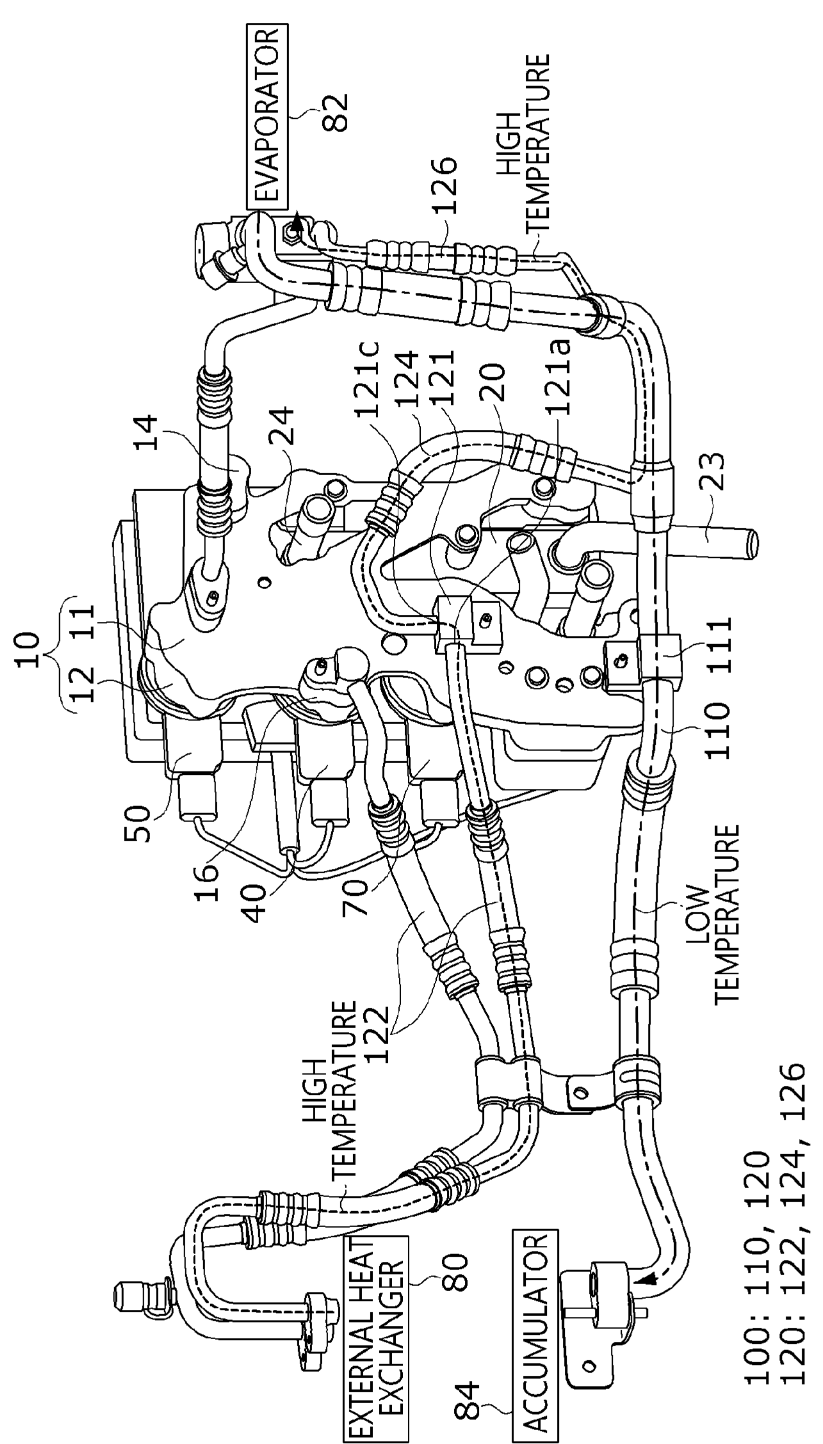
FIG. 4 is a perspective view illustrating the flows of a high-temperature fluid and a low-temperature fluid in the thermal management fluid module for a vehicle according to one exemplary embodiment of the present invention.

FIG. 1 is a perspective view illustrating a front surface of a thermal management fluid module for a vehicle according to one exemplary embodiment of the present invention. FIG. 2 is a perspective view illustrating a rear surface of the thermal management fluid module for a vehicle according to one exemplary embodiment of the present invention. FIG. 3 is a perspective view illustrating the thermal management fluid module for a vehicle according to one exemplary embodiment of the present invention. FIG. 4 is a perspective view illustrating the flows of a high-temperature fluid and a low-temperature fluid in the thermal management fluid module for a vehicle according to one exemplary embodiment of the present invention.

As shown, the thermal management fluid module for a vehicle according to one exemplary embodiment of the present invention may include a manifold plate 10 in which a plurality of fluid flow channels are formed and temperatures of fluids moving through the fluid flow channels are different, and a thermal interference avoidance unit which is coupled to the manifold plate 10 and in which fluid flow channels having a relatively high temperature or low temperature are formed to be separated and spaced apart from other fluid flow channels among the fluid flow channels.

The manifold plate 10 has substantially a plate shape in which the fluid flow channels are formed and which has a certain thickness. In this way, a first heat exchanger 20 and a second heat exchanger 60, which are heat exchange devices of a heat management system, expansion valves 30 and 70, and direction conversion valves 40 and 50 are coupled to the manifold plate 10 and modularized, thereby reducing the number of product manufacturing processes and also reducing the number of processes for vehicle assembly lines. In addition, the manifold plate 10 can simultaneously perform piping, fitting, and housing functions so that costs can be reduced, and workability can be improved.

The manifold plate 10 may include an assembly including a bottom plate 11 and a top plate 12 and may be manufactured in a coupling manner using brazing, structural adhesives, gaskets, and the like. In addition, aluminum, thermoplastic, stainless steel, or the like may be applied as a material of the manifold plate 10 in various ways according to a manufacturing method and the purpose and function.

The bottom plate 11 is formed in a plate shape, and the top plate 12 is coupled to one surface of the bottom plate 11 to protrude by a certain thickness, thereby forming the fluid flow channels between the top plate 12 and the bottom plate 11.

Referring to FIG. 2, a fluid inlet port 14, through which a high-temperature and high-pressure gaseous fluid flowing out of a compressor or an internal condenser flows, is provided on a rear surface of the manifold plate 10. In addition, various fluid ports for the inflow and outflow of a fluid may be provided on the rear surface of the manifold plate 10. In the present exemplary embodiment, an external heat exchanger discharge port 16, through which a first fluid flows out to an external heat exchanger 80, is provided. In addition, a first branch port 111 and a second branch port 121, which will be described below, may be provided on the rear surface of the manifold plate 10.

Referring again to FIG. 1, the first heat exchanger 20 and the second heat exchanger 60 are coupled to the manifold plate 10 as the heat exchange devices. The first fluid and a second fluid may exchange heat while passing through the first heat exchanger 20 and the second heat exchanger 60, respectively.

In the present exemplary embodiment, a water-cooled condenser may be applied as the first heat exchanger 20, and a chiller may be applied as the second heat exchanger 60. The water-cooled condenser serves to exchange heat of a high-temperature and high-pressure gaseous fluid (refrigerant), which flows out of a compressor or an internal condenser, with an external heat source and condense the high-temperature and high-pressure gaseous fluid into a high-pressure liquid. The chiller is a device in which a low-temperature and low-pressure fluid is supplied to exchange heat with the second fluid (coolant) moving in a coolant circulation line (not shown). The cold coolant that exchanges heat in the chiller may circulate through the coolant circulation line to exchange heat with a battery.

Meanwhile, a refrigerant or a coolant may be applied as the first fluid and the second fluid. In the present exemplary embodiment, the refrigerant may be applied as the first fluid, and the coolant may be applied as the second fluid.

The first heat exchanger 20 is provided with a first fluid port through which the first fluid flows in or out. The first fluid port includes a first inlet end 21 and a first outlet end 22 provided at an upper end portion and a lower end portion of the first heat exchanger 20, respectively. The first inlet end 21 is a portion through which the first fluid passing through a first expansion valve 30 flows in, and the first outlet end 22 is a portion through which the first fluid exchanging heat in the first heat exchanger 20 flows out. The first inlet end 21 and the first outlet end 22 may be formed in hole forms at the upper end portion and the lower end portion of the first heat exchanger 20, respectively.

In this case, in consideration of thermal interference, the first inlet end 21 may be formed at one side close to the first expansion valve 30, and the first outlet end 22 may be formed at the other side far from the first expansion valve 30. More specifically, the first inlet end 21 may be disposed closer to the first expansion valve 30 than the first outlet end 22. For example, a distance from the first expansion valve 30 to the first inlet end 21 may be shorter than a distance from the first expansion valve 30 to the first outlet end 22.

The first heat exchanger 20 is provided with a second fluid port through which the second fluid flows in or out. The second fluid port includes a second inlet end 23 and a second outlet end 24 provided at the upper end portion and the lower end portion of the first heat exchanger 20, respectively. The second inlet end 23 is a portion through which the second fluid flows in, and the second outlet end 24 is a portion through which the second fluid that has exchanged heat with the first fluid flows out. The second fluid flows in a direction (from bottom to top) opposite to a flow direction of the first fluid to exchange heat with the first fluid.

Since the above-described first fluid port and second fluid port are disposed to be separated from each other, the assemblability of a first fluid pipe and a second fluid pipe can be improved.

The first expansion valve 30 serves to control whether to expand a refrigerant flowing into the first heat exchanger 20. The first expansion valve 30 may be disposed above the first heat exchanger 20 and may expand or allow the first fluid flowing in through the fluid inlet port 14 to pass therethrough. The first fluid flowing in through the first expansion valve 30 may pass through the first heat exchanger 20 to exchange heat or may move to an external heat exchanger.

The first fluid flowing out through the first outlet end 22 of the first heat exchanger 20 flows into a first direction conversion valve 40. The first direction conversion valve 40 serves to control the direction of the first fluid flowing out of the first heat exchanger 20. The first fluid flowing into the first direction conversion valve 40 may move to the external heat exchanger 80. In this case, the first fluid may move to the external heat exchanger 80 through the external heat exchanger discharge port 16.

In addition, the first fluid flowing into the first expansion valve 30 may move to a second direction conversion valve 50 in a dehumidification mode and then may move to an evaporator 82.

The first fluid having a low temperature and low pressure is supplied to the second heat exchanger 60 to exchange heat with the second fluid (coolant) moving in the coolant circulation line (not shown). The cold second fluid that has exchanged heat in the second heat exchanger 60 may exchange heat with the battery by circulating through the coolant circulation line. The first fluid that has exchanged heat with the external heat exchanger 80 flows into the second expansion valve 70, and the first fluid that has expanded in the second expansion valve 70 flows into the second heat exchanger 60. The first fluid that has exchanged heat in the second heat exchanger 60 flows out through a lower end thereof and flows into an accumulator 84.

To this end, the second heat exchanger 60 is provided with a first fluid port through which the first fluid flows in or out. The first fluid port includes a first inlet end 61 and a first outlet end 62 provided at an upper end portion and a lower end portion of the second heat exchanger 60, respectively. The first inlet end 61 is a portion through which the first fluid flows in, and the first outlet end 62 is a portion through which the first fluid that has exchanged heat in the second heat exchanger 60 flows out. The first inlet end 61 and the first outlet end 62 may be formed in hole forms at the upper end portion and the lower end portion of the second heat exchanger 60, respectively.

In this case, in consideration of thermal interference, the first inlet end 61 of the second heat exchanger 60 may be formed at one side close to the second expansion valve 70, and the first outlet end 62 may be formed at the other side far from the second expansion valve 70. More specifically, the first inlet end 61 may be disposed closer to the second expansion valve 70 than the first outlet end 62. For example, a distance from the second expansion valve 70 to the first inlet end 61 may be shorter than a distance from the second expansion valve 70 to the first outlet end 62.

The thermal interference avoidance unit may be formed such that relatively high- or low-temperature fluid flow channels are separated and spaced apart from other fluid flow channels among the fluid flow channels formed in the manifold plate 10. When the temperatures of the fluids flowing through the fluid flow channels formed in the manifold plate 10 are similar, the fluid flow channels may be disposed in the entirety of the manifold plate 10 itself. However, according to fluid paths, relatively high-temperature or low-temperature fluids flow, and as such, as a temperature difference between the fluids increases, when the fluids flow together in the manifold plate 10, due to mutual thermal interference, thermal management performance may be degraded.

Therefore, in the present exemplary embodiment, fluid flow channels in which a temperature of a fluid flowing therethrough is greater than or less than a certain reference value are formed to be separated from the manifold plate 10 without being formed in the manifold plate 10 itself, thereby avoiding mutual thermal interference. In this way, when flow channels with different fluid temperatures are disposed to be separated from each other, thermal management performance can be maximized because thermal interference with existing flow channels does not occur.

As the thermal interference avoidance unit, any component may be applied as long as the component may include a fluid flow channel for allowing a low-temperature fluid flowing out of the evaporator 82 to flow to the accumulator 84, and a fluid flow channel for a high-temperature fluid flowing out of the external heat exchanger 80 to flow to the evaporator 82.

The thermal interference avoidance unit may be provided to be coupled to one surface of the manifold plate 10. Hereinafter, an example in which a pipe coupled to one surface of the manifold plate 10 is the thermal interference avoidance unit will be described, but the present invention is not limited thereto. The thermal interference avoidance unit may be implemented through various components such as a separate manifold-type plate.

The thermal interference avoidance unit may be disposed on the rear surface of the manifold plate 10, that is, a surface opposite to a front surface to which the top plate 12 is coupled. This is to fundamentally prevent the fluid flow channel included in the thermal interference avoidance unit from interfering with the fluid flow channel formed in the top plate 12.

The thermal interference avoidance unit may be a branch pipe 100 coupled to one surface of the manifold plate 10. The branch pipe 100 may include a first pipe 110 for allowing a low-temperature fluid flowing out of the evaporator 82 to flow to the accumulator 84, and a second pipe 120 for allowing a high-temperature fluid flowing out of the external heat exchanger 80 to flow to the evaporator 82.

Referring to FIG. 4, the first pipe 110 may extend to allow the low-temperature first fluid flowing out of the evaporator 82 to flow toward the accumulator 84. Since the first fluid flowing out of the evaporator 82 has a low temperature (10° C. to 20° C.), when the first fluid flows in the manifold plate 10, thermal interference with a high-temperature fluid flow channel may occur. Thus, the first fluid is allowed to flow along the separate first pipe 110. The first pipe 110 may be connected to a first branch port 111 coupled to one surface of the manifold plate 10. Here, a flange or the like may be applied as the first branch port 111.

In this way, when the low-temperature first fluid flows along the first pipe 110, the low-temperature first fluid flows directly to the accumulator 84 or compressor without passing through the manifold plate 10, thereby avoiding thermal interference with a high-temperature fluid flow channel.

The second pipe 120 may extend to allow the high-temperature first fluid flowing out of the external heat exchanger 80 to flow toward the evaporator 82. Since the first fluid flowing out of the external heat exchanger 80 has a high temperature (60° C. to 70° C.), when the first fluid flows in the manifold plate 10, thermal interference with a low-temperature fluid flow channel may occur. Thus, the first fluid is allowed to flow along the separate second pipe 120. The second pipe 120 may be connected to a second branch port 121 coupled to one surface of the manifold plate 10. Here, a flange or the like may be applied as the second branch port 121. It has been described above that the branch pipe 100 is connected to the branch ports 111 and 121 which have a fluid flow channel for simply switching a flow channel therein, but the present invention is not limited thereto. The branch pipe may be provided in a form connected to a flow channel switching valve with a fluid flow channel therein.

In this way, when the high-temperature first fluid flows along the second pipe 120, the high-temperature first fluid flows directly to the evaporator 82 without passing through the manifold plate 10, thereby avoiding thermal interference with a relatively low-temperature fluid flow channel.

Meanwhile, the second pipe 120 may include a first connection portion 122 connecting the external heat exchanger 80 and the second branch port 121, a second connection portion 124 connecting the second branch port 121 and one side of the first pipe 110, and a third connection portion 126 connecting one side of the first pipe 110 and the evaporator 82. A connection structure of the second pipe 120 described above is merely an example and is not limited thereto.

In addition, the diameter of the first pipe 110 may be relatively greater than the diameter of the second pipe 120. Flowing the relatively low-temperature and low-pressure first fluid in the first pipe is sensitive to flow resistance due to an area of a cross section or the like, and thus a flow cross-sectional area thereof is formed to be relatively large.

Meanwhile, a thermal management fluid module for a vehicle according to another exemplary embodiment of the present invention may include a manifold plate 10 in which a plurality of fluid channels are formed, and a branch pipe 100 which is coupled to the manifold plate 10 and is formed to allow a fluid to flow into the fluid flow channel in the manifold plate 10 or to bypass the fluid flow channel without flowing into the fluid flow channel according to a fluid circulation mode. In the present exemplary embodiment, the branch pipe 100 does not guide a fluid to flow only to the outside of the manifold plate 10 but may allow the fluid to flow into the fluid flow channel in the manifold plate 10.

A heat exchanger and various valves are coupled to one surface of the manifold plate 10, and branch ports 111 and 121 to which the branch pipe 100 is connected are provided on the other surface of the manifold plate 10. Here, to describe an example of a second branch port 121, the second branch port 121 may include a first inlet **121*a* through which a fluid flows in, a first outlet 121*b* connected to the manifold plate 10, and a second outlet 121*c* connected to the branch pipe 100 (see FIGS. 2 and 3). According to the fluid circulation mode, a fluid flowing in through the first inlet 121*a* may flow into the fluid flow channel of the manifold plate 10 through the first outlet 121*b* to flow to the heat exchanger and the valve. That is, the fluid flowing in through the first inlet 121*a* does not flow outside the manifold plate 10 but may flow into the manifold plate 10 to flow. More specifically, the fluid circulation mode includes a heating mode and a cooling mode. In the heating mode, a fluid flows into the fluid flow channel of the manifold plate 10 through the first outlet 121***b*, and in the cooling mode, the fluid flows by bypassing the manifold plate 10.

This is to prevent thermal interference by allowing the fluid to bypass the manifold plate 10 because, in the cooling mode, a temperature difference between the fluid flow channels in the manifold plate 10 is relatively large while, in the heating mode, a temperature difference between the fluid flow channels in the manifold plate 10 is relatively small and causes low thermal interference even when a fluid flows in the manifold plate 10.

According to exemplary embodiment of the present invention, since a low-temperature fluid flowing out of an evaporator flows to an accumulator without passing through a manifold plate, thermal interference with a high-temperature fluid flow channel is avoided, thereby preventing the degradation of thermal management performance.

In addition, according to exemplary embodiment of the present invention, since a high-temperature fluid flowing out of an external heat exchanger flows to an evaporator without passing through a manifold plate, thermal interference with a relatively low-temperature fluid flow channel is avoided, thereby preventing the degradation of thermal management performance.

Although the present invention has been described with reference to the specific exemplary embodiments, those skilled in the art will appreciate that various modifications and changes can be made in the present invention without departing from the spirit and scope of the invention as set forth in the claims below.

What is claimed is:

1. A thermal management fluid module for a vehicle using a circulating fluid such as a refrigerant or a coolant, the thermal management fluid module comprising:

a manifold plate in which a plurality of fluid flow channels is formed; and a thermal interference avoidance unit which is coupled to the manifold plate and in which fluid flow channels having a first temperature or a second temperature that is lower than the first temperature are formed to be separated and spaced apart from other fluid flow channels among the plurality of fluid flow channels, wherein the thermal interference avoidance unit is a branch pipe which is coupled to a surface of the manifold plate and in which at least one of the plurality of fluid flow channels is formed therein, wherein the branch pipe includes a first pipe configured to allow a first circulating fluid to flow out of an evaporator to an accumulator, and a second pipe configured to allow a second circulating fluid to flow out of an external heat exchanger to flow to the evaporator, wherein the second circulating fluid has a temperature that is higher than the first circulating fluid, wherein a first branch port and a second branch port for connection of the first pipe and the second pipe are coupled to a second the surface of the manifold plate, and wherein the second pipe includes a first connection portion configured to connect the external heat exchanger and the second branch port, a second connection portion configured to connect the second branch port and one side of the first pipe, and a third connection portion configured to connect the one side of the first pipe and the evaporator.

2. The thermal management fluid module of claim 1, wherein a diameter of the first pipe is greater than a diameter of the second pipe.

3. The thermal management fluid module of claim 1, wherein the manifold plate includes a bottom plate and a top plate coupled to protrude from a first surface of the bottom plate and form the fluid flow channels, and the branch pipe is connected to a second surface of the bottom plate.

* * * * *